(12) United States Patent
Ban

(10) Patent No.: US 7,984,173 B2
(45) Date of Patent: Jul. 19, 2011

(54) CHANNEL BUNDLING

(75) Inventor: Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 788 days.

(21) Appl. No.: 11/809,270

(22) Filed: May 30, 2007

(65) Prior Publication Data
US 2008/0298395 A1 Dec. 4, 2008

(51) Int. Cl.
*G06F 15/16* (2006.01)
(52) U.S. Cl. ........ 709/230; 709/226; 709/238; 370/464; 370/474
(58) Field of Classification Search .................. 709/200, 709/204–207, 227–230, 238; 370/464, 474
See application file for complete search history.

(56) References Cited

U.S. PATENT DOCUMENTS

| | | | |
|---|---|---|---|
| 6,628,965 B1 * | 9/2003 | LaRosa et al. | 455/557 |
| 7,039,775 B2 * | 5/2006 | Saito et al. | 711/159 |
| 7,054,991 B2 * | 5/2006 | Tanaka et al. | 711/103 |
| 7,065,579 B2 * | 6/2006 | Traversat et al. | 709/230 |
| 7,111,100 B2 * | 9/2006 | Ellerbrock | 710/300 |
| 7,167,920 B2 * | 1/2007 | Traversat et al. | 709/230 |
| 7,653,777 B2 * | 1/2010 | Tan et al. | 711/103 |

OTHER PUBLICATIONS

Bela Ban, JavaGroups—Group Communication Patterns in Java, Department of Computer Science Cornell University, Jul. 31, 1998, pp. 1-18.
Bela Ban, JavaGroups User's Guide, Nov. 16, 2002, pp. 1-39.
"FAQ for isdn4linux", Chapter 18, Matthias Hessler, v2.0.103, Jan. 15, 2006, http://www.isdn4linux.de/faq/i4lfaq-18.html.

* cited by examiner

*Primary Examiner* — Faruk Hamza
(74) *Attorney, Agent, or Firm* — Lowenstein Sandler PC

(57) ABSTRACT

A method and apparatus for processing message is described. In one embodiment, a channel layer is configured to form a channel with a corresponding process. The channel is associated with a group. A plurality of sockets is formed in a transport layer of a group communication protocol. Traffic of messages to and from the processes is distributed across the plurality of sockets in the transport layer.

24 Claims, 5 Drawing Sheets

CHANNEL BUNDLING

TECHNICAL FIELD

Embodiments of the present invention relate to group communication, and more specifically to processing of messages.

BACKGROUND

Group communication protocol designed for multicast communication may be used to communicate messages between endpoints forming a group. Communication endpoints can be processes or objects, or any entity that can send and receive messages to/from a group.

The destination address of a node may comprise an IP address and port of a receiver socket. However, the use of such address provides some disadvantages. For example, when a node is shunned and later rejoins, its physical address may have changed. A communication directed to a NIC may be interrupted if the NIC fails. Also, the sender's address may be changed by a Network Address Translator. As such, it would be desirable to provide for a logical address scheme that resolves the above problems. Further, it would be desirable to provide for a channel bundling scheme to distribute the traffic across a transport layer.

BRIEF DESCRIPTION OF THE DRAWINGS

The present invention is illustrated by way of example, and not by way of limitation, in the figures of the accompanying drawings and in which.

DETAILED DESCRIPTION

Figure 1:
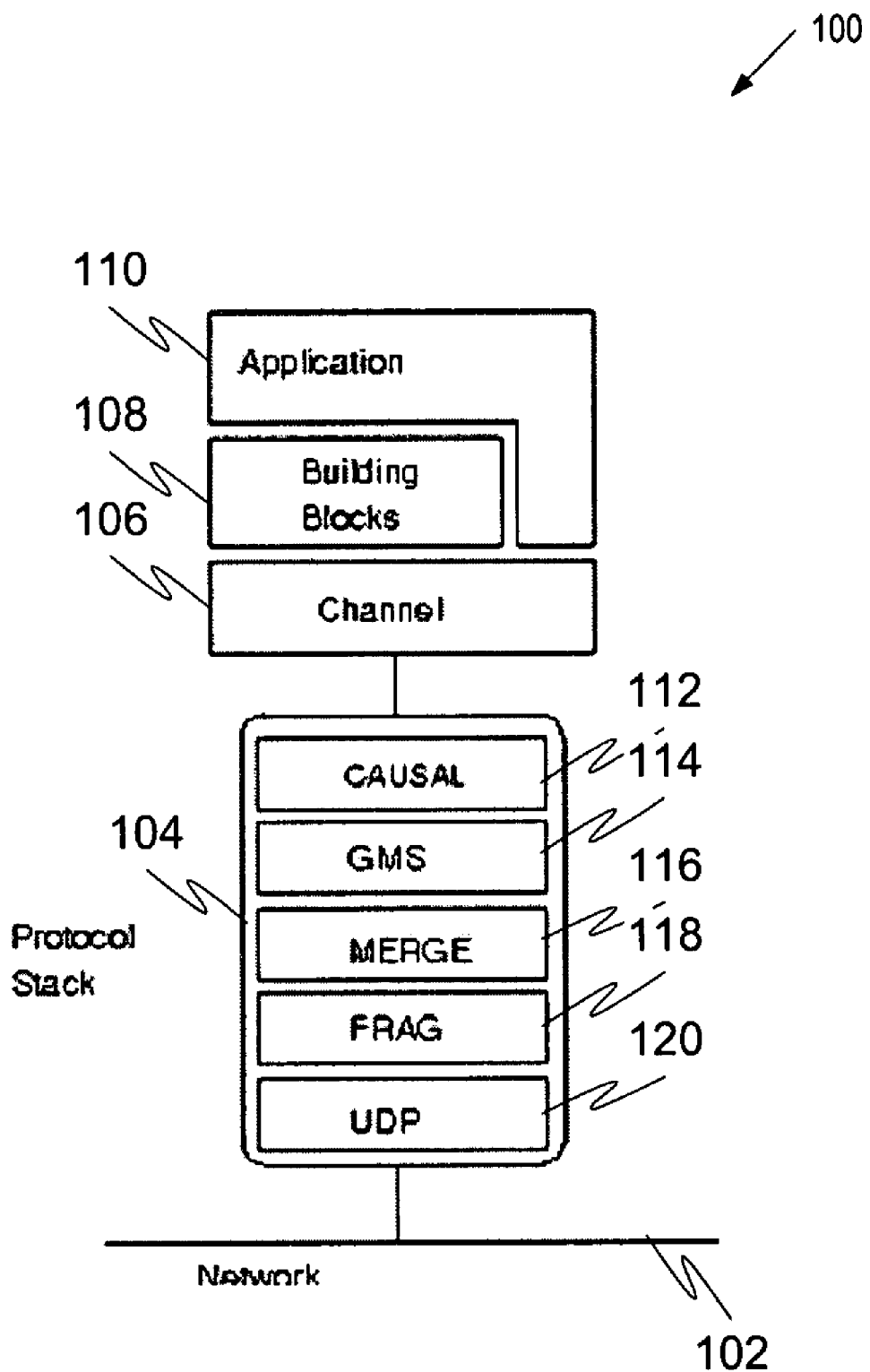
FIG. 1 illustrates a network architecture of a group communication in which embodiments of the present invention may be implemented.

Described herein is a method and apparatus for channel bundling in a group communication scheme. A channel is formed with a corresponding process, the channel associated with a group. A plurality of sockets is formed in a transport layer of a group communication protocol. Traffic to and from the processes is distributed across the plurality of sockets in the transport layer.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Group Communication Architecture

FIG. 1 illustrates an exemplary network architecture of a group communication 100, such as JGroups, in which embodiments of the present invention may operate.

JGroups is toolkit for reliable group communication. Processes can join a group, send messages to all members or single members and receive messages from members in the group. The system keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same LAN, or across a WAN. A member can be part of multiple groups.

The group communication architecture may comprise three parts: (1) a channel API 106 used by application programmers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 comprising several protocols 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 consumes it.

When an application 110 connects to a channel 106, protocol stack 106 will be started, and when it disconnects protocol stack 104 will be stopped. When the channel 106 is closed, the stack 140 will be destroyed, releasing its resources.

Channel

To join a group and send messages, a process has to create a channel and connect to it using the group name (all channels with the same name form a group). The channel is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. Channels always know who the other members are in the same group: a list of member addresses can be retrieved from any channel. This list is called a view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

Channels may be similar to BSD sockets: messages are stored in a channel until a client removes the next one (pull-principle). When no message is currently available, a client is blocked until the next available message has been received.

A channel may be implemented over a number of alternatives for group transport. Therefore, a channel is an abstract class, and concrete implementations are derived from it, e.g. a channel implementation using its own protocol stack, or others using existing group transports such as Jchannel and EnsChannel. Applications only deal with the abstract channel class, and the actual implementation can be chosen at startup time.

The properties for a channel may be specified in a colon-delimited string format. When creating a channel (JChannel) a protocol stack will be created according to these properties. All messages will pass through this stack, ensuring the quality of service specified by the properties string for a given channel.

Building Blocks

Channels are simple and primitive. They offer the bare functionality of group communication, and have on purpose been designed after the simple model of BSD sockets, which are widely used and well understood. The reason is that an application can make use of just this small subset of JGroups, without having to include a whole set of sophisticated classes, that it may not even need. Also, a somewhat minimalistic interface is simple to understand: a client needs to know about 12 methods to be able to create and use a channel (and oftentimes will only use 3-4 methods frequently).

Channels provide asynchronous message sending/reception, somewhat similar to UDP. A message sent is essentially put on the network and the send( ) method will return immediately. Conceptual requests, or responses to previous requests, are received in undefined order, and the application has to take care of matching responses with requests.

Also, an application has to actively retrieve messages from a channel (pull-style); it is not notified when a message has been received. Note that pull-style message reception often needs another thread of execution, or some form of event-loop, in which a channel is periodically polled for messages.

JGroups offers building blocks that provide more sophisticated APIs on top of a Channel. Building blocks either create and use channels internally, or require an existing channel to be specified when creating a building block. Applications communicate directly with the building block, rather than the channel. Building blocks are intended to save the application programmer from having to write tedious and recurring code, e.g. request-response correlation.

Protocol Stack

As discussed above, JGroups provides two channel implementations: an Ensemble-based channel and its own channel based on a Java protocol stack. The latter is a protocol stack containing a number of protocol layers in a bidirectional list. FIG. 1 illustrates protocol stack 104 with the following protocols: CAUSAL 112, GMS 114, MERGE 116, FRAG 118, UDP 120.

All messages sent and received over the channel have to pass through the protocol stack. Every layer may modify, reorder, pass or drop a message, or add a header to a message. A fragmentation layer might break up a message into several smaller messages, adding a header with an id to each fragment, and re-assemble the fragments on the receiver's side.

The composition of the protocol stack, i.e. its layers, is determined by the creator of the channel: a property string defines the layers to be used (and the parameters for each layer). This string might be interpreted differently by each channel implementation; in JChannel it is used to create the stack, depending on the protocol names given in the property.

Knowledge about the protocol stack is not necessary when only using channels in an application. However, when an application wishes to ignore the default properties for a protocol stack, and configure their own stack, then knowledge about what the individual layers are supposed to do is needed. Although it is syntactically possible to stack any layer on top of each other (they all have the same interface), this wouldn't make sense semantically in most cases.

Message

Figure 2:
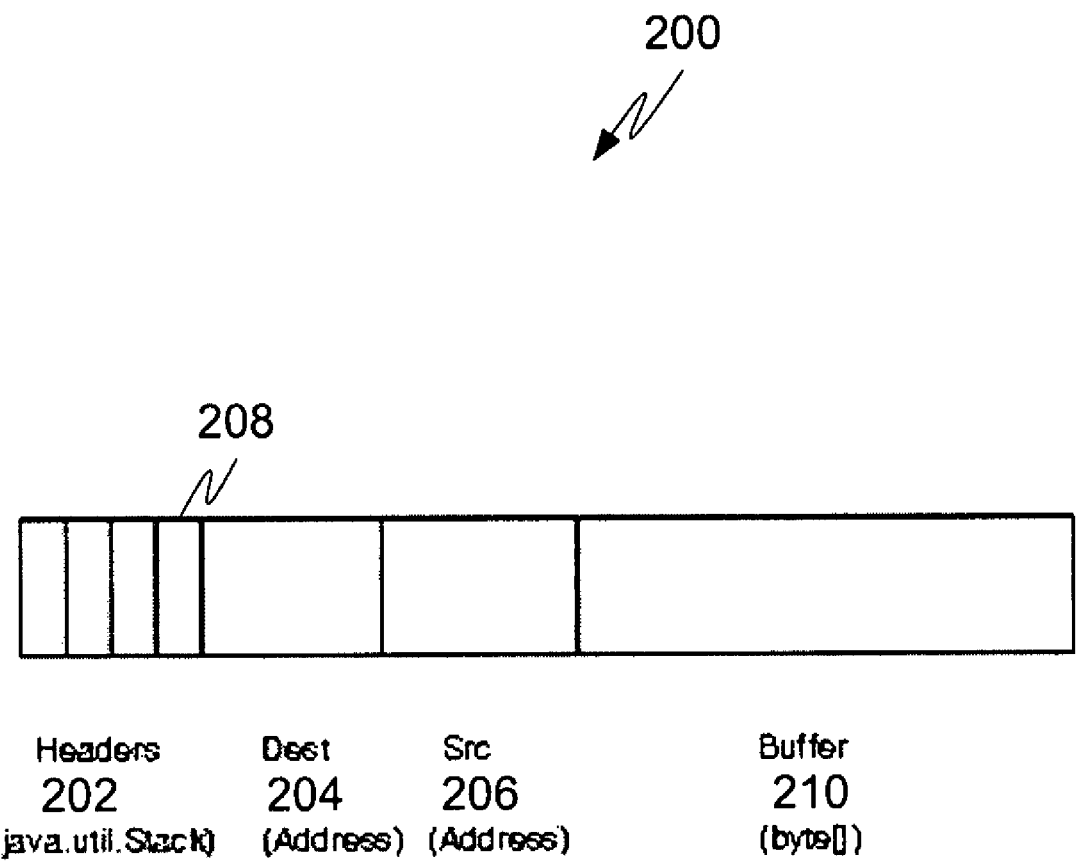
FIG. 2 illustrates a block diagram of one embodiment of a structure of a message.

Data is sent between members in the form of messages. A message can be sent by a member to a single member, or to all members of the group of which the channel is an endpoint. An example of a structure of a message 200 is illustrated in FIG. 2.

The message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader( ), and removeHeader( ) of message 200 can be used to manipulate headers 202.

The destination address 204 may include the address of the receiver. If null, the message will be sent to all current group members.

The source address 206 may include the address of a sender. It can be left null, and will be filled in by the transport protocol (e.g. UDP) before the message is put on the network 102.

One byte of the message 200 may be used for flags 208. Examples of flags may be OOB, LOW_PRIO and HIGH_PRIO.

The payload 210 may include the actual data (as a byte buffer). The message class contains convenience methods to set a serializable object and to retrieve it again, using serialization to convert the object to/from a byte buffer.

The message 200 may be similar to an IP packet and consists of the payload (a byte buffer) and the addresses of the sender and receiver (as addresses). Any message put on the network 102 can be routed to its destination (receiver address), and replies can be returned to the sender's address.

A message usually does not need to fill in the sender's address when sending a message; this is done automatically by the protocol stack before a message is put on the network. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members would look like this:

```
Message msg=new Message(null, null, "Hello".getBytes( ));
channel.send(msg);
```

View

A View is a list of the current members of a group. It consists of a ViewId, which uniquely identifies the view (see below), and a list of members. Views are set in a channel automatically by the underlying protocol stack whenever a new member joins or an existing one leaves (or crashes). All members of a group see the same sequence of views.

Note that there is a comparison function which orders all the members of a group in the same way. Usually, the first member of the list is the coordinator (the one who emits new views). Thus, whenever the membership changes, every member can determine the coordinator easily and without having to contact other members.

The code below shows how to send a (unicast) message to the first member of a view (error checking code omitted):

```
View myview=channel.getView( );
Address first=myview.getMembers( ).first( );
Message msg=new Message(first, null, "Hello world");
channel.send(msg);
```

Whenever an application is notified that a new view has been installed (e.g. by MembershipListener.viewAccepted( ) or Channel.receive( )), the view is already set in the channel. For example, calling Channel.getView( ) in a viewAccepted( ) callback would return the same view (or possibly the next one in case there has already been a new view).

A ViewId is used to uniquely number views. It consists of the address of the view creator and a sequence number. View Ids can be compared for equality and put in a hashtable as they implement equals( ) and hashCode( ) methods.

Whenever a group splits into subgroups, e.g. due to a network partition, and later the subgroups merge back together, a MergeView instead of a View will be received by the application. The MergeView class is a subclass of View and contains as additional instance variable the list of views that were merged. As an example if the group denoted by view V1:(p,q,r,s,t) split into subgroups V2:(p,q,r) and V2:(s,t), the merged view might be V3:(p,q,r,s,t). In this case the MergeView would contains a list of 2 views: V2:(p,q,r) and V2:(s,t).

Channel States

Figure 3:
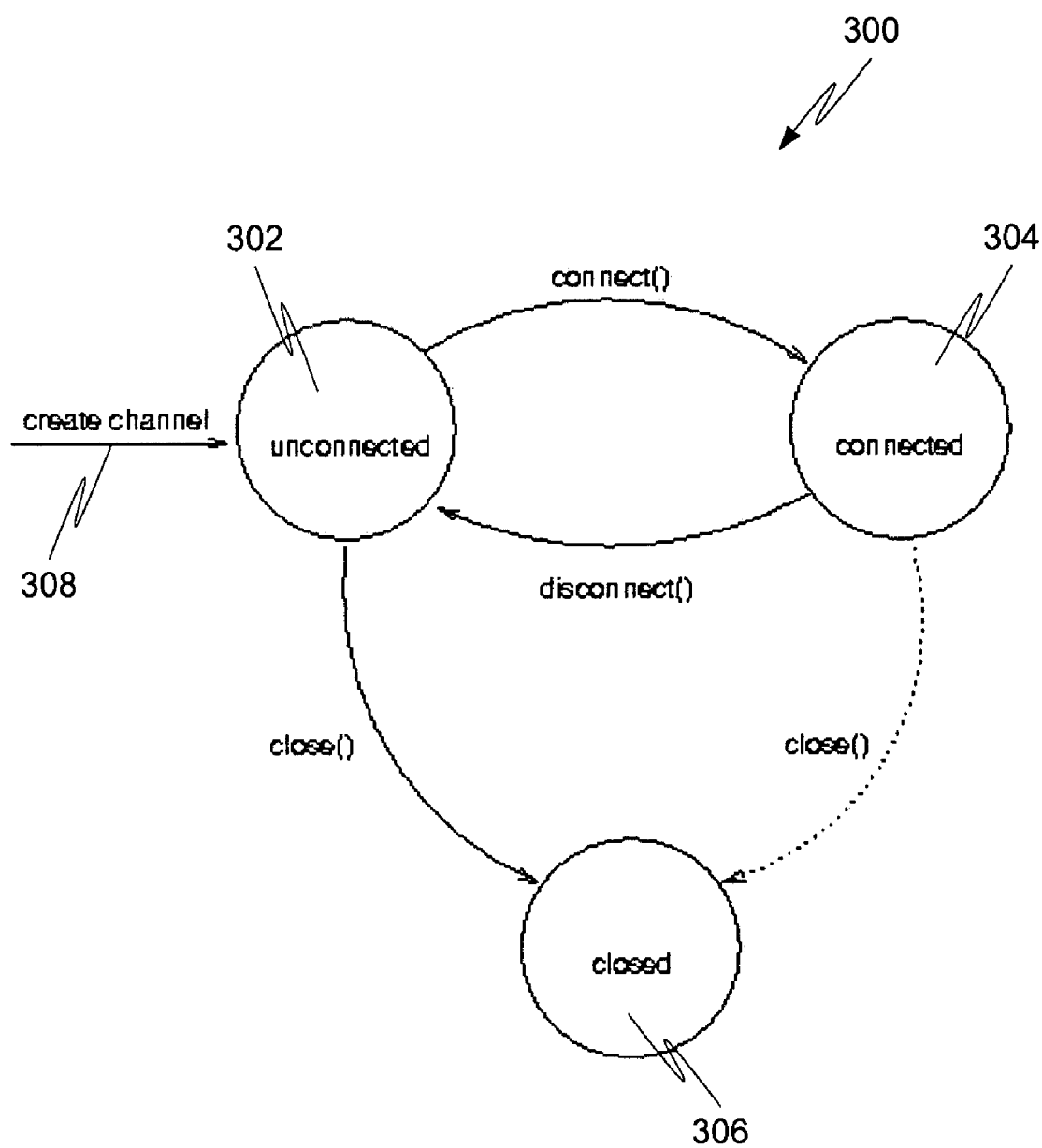
FIG. 3 illustrates a block diagram of one embodiment of channel states.

A state transition diagram 300 for the major states a channel can assume are shown in FIG. 3. In order to join a group and send messages, a process has to create a channel. A channel is like a socket. When a client connects to a channel, it gives the name of the group it would like to join. Thus, a channel is (in its connected state) always associated with a particular group. The protocol stack takes care that channels with the same group name find each other: whenever a client connects to a channel given group name G, then it tries to find existing channels with the same name, and joins them, resulting in a new view being installed (which contains the new member). If no members exist, a new group will be created.

When a channel is first created at 308, it is in the unconnected state 302. An attempt to perform certain operations which are only valid in the connected state (e.g. send/receive messages) will result in an exception. After a successful connection by a client, it moves to the connected state 304. Now channels will receive messages, views and suspicions from other members and may send messages to other members or to the group. Getting the local address of a channel is guaranteed to be a valid operation in this state (see below). When the channel is disconnected, it moves back to the unconnected state 302. Both a connected and unconnected channel may be closed 306, which makes the channel unusable for further operations. Any attempt to do so will result in an exception. When a channel is closed directly from a connected state, it will first be disconnected, and then closed.

Creating a Channel

A channel can be created in two ways: an instance of a subclass of Channel is created directly using its public constructor (e.g. new JChannel( )), or a channel factory is created, which—upon request—creates instances of channels. We will only look at the first method of creating channel: by direct instantiation. Note that instantiation may differ between the various channel implementations. As example we will look at JChannel.

The public constructor of JChannel looks as follows:
public JChannel(Object properties) throws ChannelException { }

It creates an instance of JChannel. The properties argument defines the composition of the protocol stack (number and type of layers, parameters for each layer, and their order). For JChannel, this has to be a String (see Section 3.7.2, "Channel properties" for how to define one's own properties string). An example of a channel creation is:

```
String
props="UDP(mcast_addr=228.1.2.3;mcast_port=45566;ip_ttl=32):" +
    "PING(timeout=3000;num_initial_members=6):" +
    "FD(timeout=5000):" +
    "VERIFY_SUSPECT(timeout=1500):" +
    "pbcast.STABLE(desired_avg_gossip=10000):" +
    "pbcast.NAKACK(gc_lag=10;retransmit_timeout=3000):" +
    "UNICAST(timeout=5000;min_wait_time=2000):" +
    "FRAG:" +
    "pbcast.GMS(initial_mbrs_timeout=4000;join_timeout=5000;" +
    "join_retry_timeout=2000;shun=false;print_local_addr=false)";
JChannel channel;
try {
channel=new JChannel(props);
}
catch(Exception ex) {
// channel creation failed
}
```

The argument is a colon-delimited string of protocols, specified from bottom to top (left to right). The example properties argument will be used to create a protocol stack that uses IP Multicast (UDP) as bottom protocol, the PING protocol to locate the initial members, FD for failure detection, VERIFY_SUSPECT for double-checking of suspected members, STABLE for garbage collection of messages received by all members, NAKACK for lossless delivery of multicast messages, UNICAST for lossless delivery of unicast messages and GMS for group membership (handling of join or leave requests).

If the properties argument is null, the default properties will be used. An exception will be thrown if the channel cannot be created. Possible causes include protocols that were specified in the property argument, but were not found, or wrong parameters to protocols.

Using XML to Define a Protocol Stack

In version 2.0 of JGroups an XML-based scheme to define protocol stacks was introduced. Instead of specifying a string containing the protocol spec, an URL pointing to a valid protocol stack definition can be given. For example, the Draw demo can be launched as follows:

java org.javagroups.demos.Draw-props file:/home/bela/vsync.xml or java org.javagroups.demos.Draw-props http://www.jgroups.com/udp.xml In the latter case, an application downloads its protocol stack specification from a server, which allows for central administration of application properties. Plain and XML-based configuration of protocol stacks will be discussed in more detail in chapter.

Channel Properties

A property string consists of a number of properties separated by colons:
"<prop1>(arg1=val1):<prop2>(arg1=val1;arg2=val2):<prop3>:<propn>"

Each property relates directly to a protocol layer, which is implemented as a Java class. When a protocol stack is to be created based on the above property string, the first property becomes the bottom-most layer, the second one will be placed on the first, etc: the stack is created from the bottom to the top, as the string is parsed from left to right. Each property has to be the name of a Java class that resides in the org.jgroups.stack.protocols package. Note that only the base name has to be given, not the fully specified class name (UDP instead of org.jgroups.stack.protocols.UDP). If the protocol class is not found, JGroups assumes that the name given is a fully qualified classname and will therefore try to instantiate that class. If this does not work an exception is thrown. This allows for protocol classes to reside in different packages altogether, e.g. a valid protocol name could be com.sun.eng.protocols.reliable.UCAST.

Each layer may have zero or more arguments, which are specified as a list of name/value pairs in parentheses directly after the property. In the example above, the first protocol layer has 1 argument, the second 2, the third none. When a layer is created these properties (if there are any) will be set in a protocol, thus configuring the protocol stack according to the channel creator.

As an example the property string below instructs JGroups to create a JChannel with protocols UDP, PING, FD and GMS:
"UDP(mcast_addr=228.10.9.8;mcast_port=5678):PING:FD:GMS"

The UDP protocol layer is at the bottom of the stack, and it should use mcast address 228.10.9.8. and port 5678 rather than the default IP multicast address and port. Property UDP refers to a class org.jgroups.stack.protocols.UDP, which is subsequently loaded and an instance of which is created as protocol layer. If any of these classes are not found, an exception will be thrown and the construction of the stack will be aborted.

Note that all members in a group have to have the same protocol stack.

Setting Options

A number of options can be set in a channel. To do so, the following method is used:
  public void setOpt(int option, Object value);

Arguments are the options number and a value. The following options are currently recognized:

Channel.BLOCK

The argument is a boolean object. If true, block messages will be received. If this option is set to true, views will also be set to true. Default is false.

Channel.LOCAL

Local delivery. The argument is a boolean value. If set to true, a member will receive all messages it sent to itself. Otherwise, all messages sent by itself will be discarded. This option allows to send messages to the group, without receiving a copy. Default is true (members will receive their own copy of messages multicast to the group).

Channel.AUTO_RECONNECT

When set to true, a shunned channel will leave the group and then try to automatically re-join. Default is false Channel.AUTO_GETSTATE When set to true a shunned channel, after reconnection, will attempt to fetch the state from the coordinator. This requires AUTO_RECONNECT to be true as well. Default is false.

The equivalent method to get options is getOpt( ):
  public Object getOpt(int option);

Given an option, the current value of the option is returned.

Connecting to a Channel

When a client wants to join a group, it connects to a channel giving the name of the group to be joined:
  public void connect(String groupname) throws ChannelClosed;

The group address is a string, naming the group to be joined. All channels that are connected to the same group (same name) form a group. Messages multicast on any channel in the group will be received by all members (including the one who sent it [3]).

The method returns as soon as the group has been joined successfully. If the channel is in the closed state (see FIG. 3), an exception will be thrown. If there are no other members, i.e. no other client has connected to a group with this name, then a new group is created and the member joined. The first member of a group becomes its coordinator. A coordinator is in charge of multicasting new views whenever the membership changes.

Getting the Local Address and the Group Name

Method getLocalAddress( ) returns the local address of the channel. In the case of JChannel, the local address is generated by the bottom-most layer of the protocol stack when the stack is connected to. That means that—depending on the channel implementation—the local address may or may not be available when a channel is in the unconnected state.

public Address getLocalAddress( );

Method getChannelName( ) returns the name of the group in which the channel is a member:

public String getChannelName( );

Again, the result is undefined if the channel is in the unconnected or closed state.

Getting the Current View

The following method can be used to get the current view of a channel:

public View getview( );

This method does not retrieve a new view (message) from the channel, but only returns the current view of the channel. The current view is updated every time a view message is received: when method receives is called, and the return value is a view, before the view is returned, it will be installed in the channel, i.e. it will become the current view.

Calling this method on an unconnected or closed channel is implementation defined. A channel may return null, or it may return the last view it knew of.

Sending a Message

Once the channel is connected, messages can be sent using the send( ) methods:

public void send(Message msg) throws ChannelNotConnected, ChannelClosed;
    public void send(Address dst, Address src, Object obj) throws ChannelNotConnected, ChannelClosed;

The first send( ) method has only one argument, which is the message to be sent. The message's destination should either be the address of the receiver (unicast) or null (multicast). When it is null, the message will be sent to all members of the group (including itself). The source address may be null; if it is, it will be set to the channel's address (so that recipients may generate a response and send it back to the sender).

The second send( ) method is a helper method and uses the former method internally. It requires the address of receiver and sender and an object (which has to be serializable), constructs a Message and sends it.

If the channel is not connected, or was closed, an exception will be thrown upon attempting to send a message.

Here's an example of sending a (multicast) message to all members of a group:

```
Hashtable data; // any serializable data
try {
channel.send(null, null, data);
}
catch(Exception ex) {
// handle errors
}
```

The null value as destination address means that the message will be sent to all members in the group. The sender's address will be filled in by the bottom-most protocol. The payload is a hashtable, which will be serialized into the message's buffer and unserialized at the receiver's end. Alternatively, any other means of generating a byte buffer and setting the message's buffer to it (e.g. using Message.setBuffer( )) would also work.

Here's an example of sending a (unicast) message to the first member (coordinator) of a group:

```
Address receiver;
Message msg;
Hashtable data;
try {
receiver=channel.getView( ).getMembers( ).first( );
channel.send(receiver, null, data);
}
catch(Exception ex) {
// handle errors
}
```

It creates a Message with a specific address for the receiver (the first member of the group). Again, the sender's address can be left null as it will be filled in by the bottom-most protocol.

Receiving a Message

Method receives is used to receive messages, views, suspicions and blocks:

public Object receive(long timeout)
    throws ChannelNotConnected, ChannelClosed, Timeout;

A channel receives messages asynchronously from the network and stores them in a queue. When receives is called, the next available message from the top of that queue is removed and returned. When there are no messages on the queue, the method will block. If timeout is greater than 0, it will wait the specified number of milliseconds for a message to be received, and throw a TimeoutException exception if none was received during that time. If the timeout is 0 or negative, the method will wait indefinitely for the next available message.

Depending on the channel options (see Section 3.7.3, "Setting options"), the following types of objects may be received:

Message

A regular message. To send a response to the sender, a new message can be created. Its destination address would be the received message's source address. Method Message.makeReply( ) is a helper method to create a response.

View

A view change, signalling that a member has joined, left or crashed. The application may or may not perform some action upon receiving a view change (e.g. updating a GUI object of the membership, or redistributing a load-balanced collaborative task to all members). Note that a longer action, or any action that blocks should be performed in a separate thread. A MergeView will be received when 2 or more subgroups merged into one (see Section 3.5.2, "MergeView" for details). Here, a possible state merge by the application needs to be done in a separate thread.

SuspectEvent

Notification of a member that is suspected. Method SuspectEvent.getMember( ) retrieves the address of the suspected member. Usually this message will be followed by a view change.

BlockEvent

The application has to stop sending messages. When the application has stopped sending messages, it needs to acknowledge this message with a Channel.blockOk( ) method.

The BlockEvent reception can be used to complete pending tasks, e.g. send pending messages, but once Channel.blockOk( ) has been called, all threads that send messages (calling Channel.send( ) or Channel.down( )) will be blocked until FLUSH unblocks them.

UnblockEvent

The application can resume sending messages. Any previously messages blocked by FLUSH will be unblocked; when the UnblockEvent is received the channel has already been unblocked.

GetStateEvent

Received when the application's current state should be saved (for a later state transfer. A copy of the current state should be made (possibly wrapped in a synchronized statement and returned calling method Channel.returnState( ). If state transfer events are not enabled on the channel (default), then this event will never be received. This message will only be received with the Virtual Synchrony suite of protocols (see the Programmer's Guide).

StreamingGetStateEvent

Received when the application's current state should be provided to a state requesting group member. If state transfer events are not enabled on the channel (default), or if channel is not configured with pbcast.STREAMING_STATE_TRANSFER then this event will never be received.

SetStateEvent

Received as response to a getState(s) method call. The argument contains the state of a single member (byte[ ]) or of all members (Vector). Since the state of a single member could also be a vector, the interpretation of the argument is left to the application.

StreamingSetStateEvent

Received at state requesting member when the state InputStream becomes ready for reading. If state transfer events are not enabled on the channel (default), or if channel is not configured with pbcast.STREAMING_STATE_TRANSFER then this event will never be received.

The caller has to check the type of the object returned. This can be done using the instance of operator, as follows:

```
Object obj;
Message msg;
View v;
obj=channel.receive(0); // wait forever
if(obj instanceof Message)
msg=(Message)obj;
else if(obj instanceof View)
v=(View)obj;
else
; // don't handle suspicions or blocks
```

If for example views, suspicions and blocks are disabled, then the caller is guaranteed to only receive return values of type Message. In this case, the return value can be cast to a Message directly, without using the instance of operator.

If the channel is not connected, or was closed, a corresponding exception will be thrown.

The example below shows how to retrieve the "Hello world" string from a message:

```
Message msg; // received above
String s;
try {
s=(String)msg.getObject( ); // error if object not Serializable
// alternative: s=new String(msg.getBuffer( ));
}
catch(Exception ex) {
// handle errors, e.g. casting error above)
}
```

The Message.getObject( ) method retrieves the message's byte buffer, converts it into a (serializable) object and returns the object.

Channel Bundling

Traffic can be distributed across multiple sockets in a transport. For example, if we have eth0 and eth1, and both are 100 Mbps "full duplex". Then, we should be able to send 100 Mbps on eth0 and 100 Mbps on eth1 simultaneously.

Figure 4:
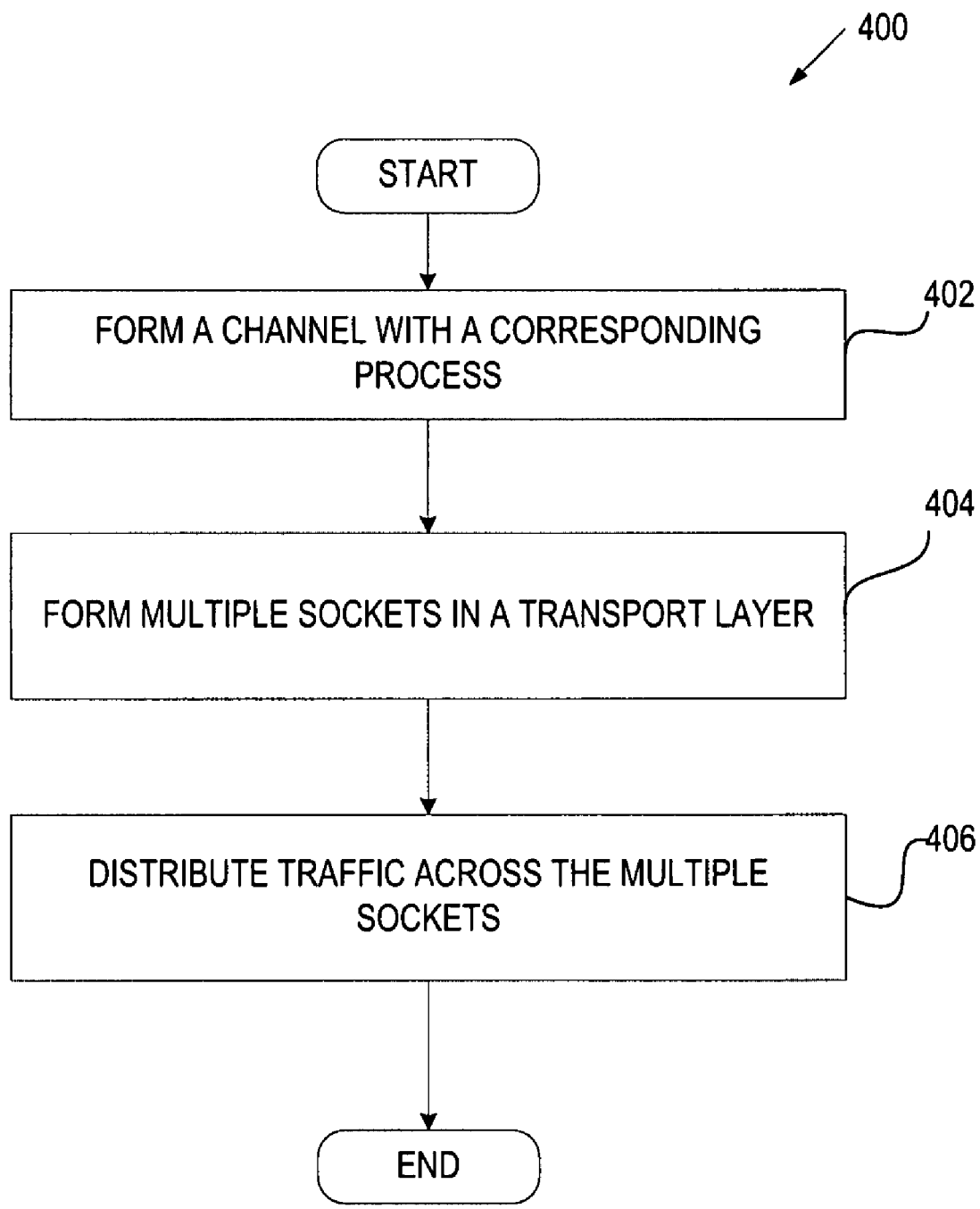
FIG. 4 illustrates a flow diagram of one embodiment of a method for bundling channels for a group communication protocol.

FIG. 4 illustrates a flow diagram of one embodiment for a method for bundling channels. At 402, a channel is formed with a corresponding process. The channel is associated with a group. At 404, a plurality of sockets is formed in a transport layer of a group communication protocol. At 406, traffic of messages to and from the processes is distributed across the plurality of sockets in the transport layer.

Logical Addresses

Conventionally, the address chosen by each node is essentially the IP address and port of the receiver socket. However, for the following reasons, this is not good enough:

In the case where the node is shunned (excluded) and re-joins after leaving, the same logical address would be desirable although the physical address has changed.

In the case where a NIC goes down, we want to continue sending/receiving on a different NIC.

In the case where the sender sends on all available NICs (send_on_all_interfaces="true"), this means that—if we take the receiver's datagram packet's address to be the identity of the sender—we get N different identities; 1 for each interface the message is sent on.

In the case where a Network Address Translation is used, the sender's address might get changed by the NAT.

In order to overcome the above challenges, one embodiment of a logical address may be as follows. A logical address may be selected, either by JGroups, or set by a user on channel creation. The lifetime of this address is the lifetime of the process in which the channel is created, or until channel.close( ) or disconnects is called.

Each member may have a small cache, in which it associates the logical addresses for messages received with the sender's address. When a message is to be sent to a logical address (unicast message), the corresponding physical address is looked up from the cache. In accordance with another embodiment, there may be multiple physical addresses if the same message was sent on different interfaces (send_on_all_interfaces="true").

The logical addresses must be picked such that they cannot be reused after disconnect( )/close( ). FIG. 4 illustrates a table of logical addresses in accordance with one embodiment.

The logical address scheme may be written in Java to provide reliable multicast communication. First, a logical address is formed upon a creation of a channel of a group communication protocol. An association of the logical address with a message received with a sender's address is stored in a cache of a member of the group. The logical address is dissolved when the channel is to be closed or disconnected. The logical address is formed independently of an IP address and a port of a receiver socket. The logical address may be selected by a user on channel creation. Each channel may be associated with a corresponding group. The logical address is selected such that it cannot be reused after a corresponding channel is closed or disconnected.

Computer System

Figure 5:
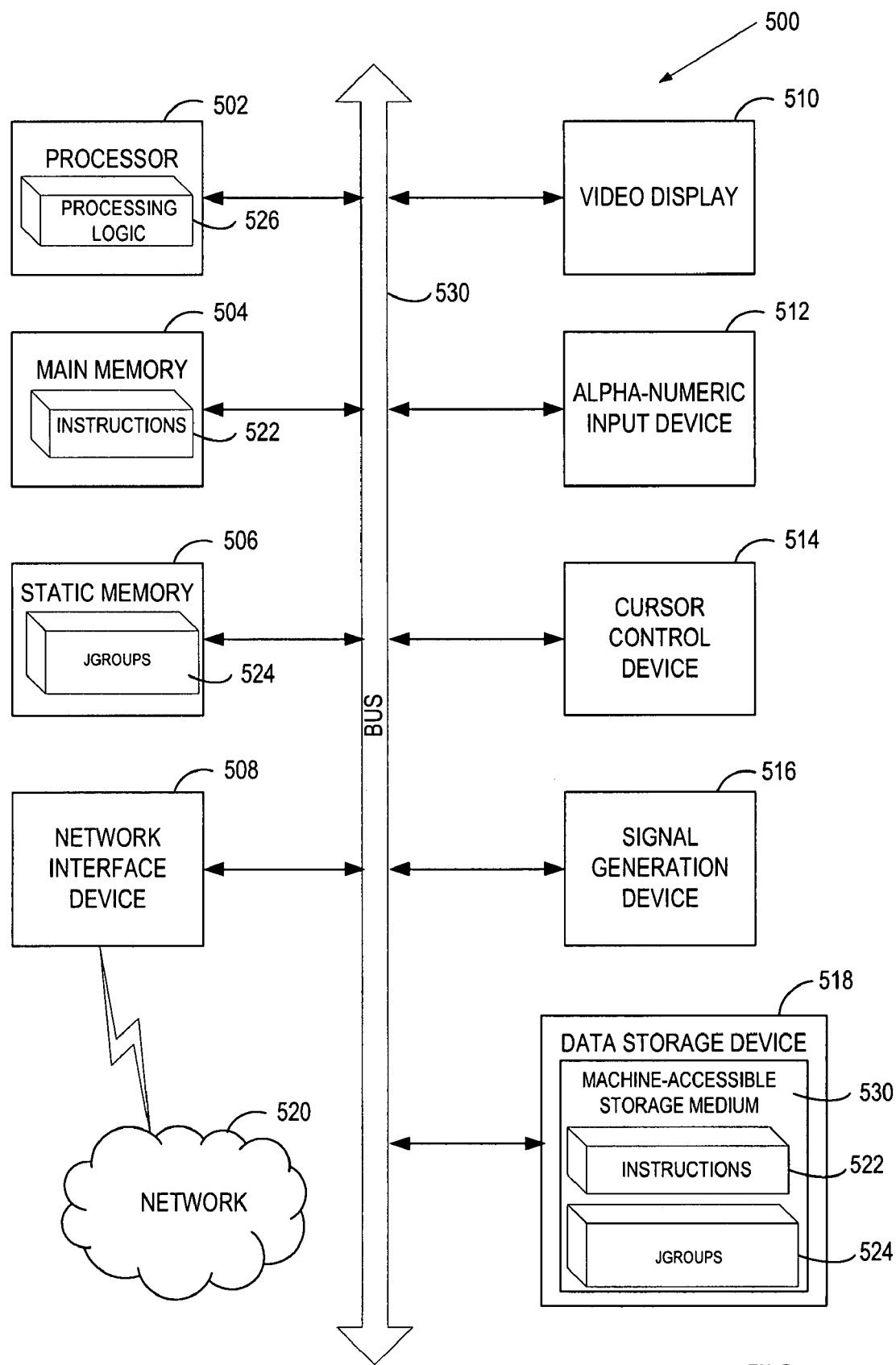
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to JGroups and concurrent stack configurations 524. JGroups and concurrent stack configurations 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for selecting and configuring a logical address has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for processing messages, the method comprising:
    forming a channel with a corresponding process at a channel layer module of a processing device, wherein channels with a same name form a group of member processes;
    forming a plurality of sockets for the corresponding process in a transport layer of a group communication protocol;
    distributing a traffic of messages to and from the processes across the plurality of sockets in the transport layer;
    forming a logical address upon a creation of a channel of the group communication protocol;
    storing an association of the logical address with a message received with a sender's address in a cache of a member of the group; and
    dissolving the logical address when the channel is to be closed or disconnected.

2. The method of claim 1 further comprising:
    receiving packets from a plurality of senders with the transport layer, the transport layer comprising a multicast receiver thread, a unicast receiver thread, and a connection table.

3. The method of claim 2 further comprising:
    processing a packet with a thread from a thread pool.

4. The method of claim 3 further comprising:
    forming another thread to process the packet when all threads from the thread pool are busy.

5. The method of claim 3 wherein the thread sends the packets up the transport layer to a corresponding channel of a channel layer, a building block layered on top of the channel layer, and an application programming interface layered on top of the building block.

6. The method of claim 1 wherein the logical address is formed independently of an IP address and a port of a receiver socket.

7. The method of claim 1 wherein the logical address is selected by a user on channel creation.

8. The method of claim 1 wherein the logical address is selected such that it cannot be reused after a corresponding channel is closed or disconnected.

9. A non-transitory computer-accessible storage medium including data that, when accessed by a computer system, cause the computer system to perform a method comprising:
   forming a channel with a corresponding process at a channel layer module of a processing device, wherein channels with a same name form a group of member processes;
   forming a plurality of sockets for the corresponding process in a transport layer of a group communication protocol;
   distributing a traffic of messages to and from the processes across the plurality of sockets in the transport layer;
   forming a logical address upon a creation of a channel of a group communication protocol;
   storing an association of the logical address with a message received with a sender's address in a cache of a member of the group; and
   dissolving the logical address when the channel is to be closed or disconnected.

10. The non-transitory computer-accessible storage medium of claim 9 wherein the method further comprises:
    receiving packets from a plurality of senders with the transport layer, the transport layer comprising a multicast receiver thread, a unicast receiver thread, and a connection table.

11. The non-transitory computer-accessible storage medium of claim 10 wherein the method further comprises:
    processing a packet with a thread from a thread pool.

12. The non-transitory computer-accessible storage medium of claim 11 wherein the method further comprises:
    forming another thread to process the packet when all threads from the thread pool are busy.

13. The non-transitory computer-accessible storage medium of claim 11 wherein the thread sends the packets up the transport layer to a corresponding channel of a channel layer, a building block layered on top of the channel layer, and an application programming interface layered on top of the building block.

14. The non-transitory computer-accessible storage medium of claim 9 wherein the logical address is formed independently of an IP address and a port of a receiver socket.

15. The non-transitory computer-accessible storage medium of claim 9 wherein the logical address is selected by a user on channel creation.

16. The non-transitory computer-accessible storage medium of claim 9 wherein the logical address is selected such that it cannot be reused after a corresponding channel is closed or disconnected.

17. An apparatus for processing messages comprising:
    an application programming interface for receiving and sending messages;
    a building block layer coupled to the application programming interface;
    a channel layer coupled to the building block layer; and
    a transport protocol stack coupled to the channel layer for implementing properties specified by the channel layer,
    wherein the channel layer is configured to form a channel with a corresponding process, wherein channels with a same name form a group of member processes, to form a plurality of sockets for the corresponding process in a transport layer of a group communication protocol, to distribute a traffic of messages to and from the processes across the plurality of sockets in the transport layer, to form a logical address upon a creation of a channel of the group communication protocol, to store an association of the logical address with a message received with a sender's address in a cache of a member of the group, and to dissolve the logical address when the channel is to be closed or disconnected.

18. The apparatus of claim 17 wherein the channel layer is to further receive packets from a plurality of senders with the transport layer, the transport layer comprising a multicast receiver thread, a unicast receiver thread, and a connection table.

19. The apparatus of claim 17 wherein the channel layer is to further process a packet with a thread from a thread pool.

20. The apparatus of claim 17 wherein the channel layer is to further form another thread to process the packet when all threads from the thread pool are busy.

21. The apparatus of claim 17 wherein the thread sends the packets up the transport layer to a corresponding channel of a channel layer, a building block layered on top of the channel layer, and an application programming interface layered on top of the building block.

22. The apparatus of claim 17 wherein the logical address is formed independently of an IP address and a port of a receiver socket.

23. The apparatus of claim 17 wherein the logical address is selected by a user on channel creation.

24. The method of claim 17 wherein the logical address is selected such that it cannot be reused after a corresponding channel is closed or disconnected.

* * * * *